United States Patent [19]

Linden

[11] 4,396,647

[45] Aug. 2, 1983

[54] VAPOR PERMEATION CURABLE COATING COMPOSITIONS CONTAINING 2,3',4-TRIHYDROXYDIPHENYL

[75] Inventor: Gary L. Linden, Upper Arlington, Ohio

[73] Assignee: Ashland Oil, Inc., Dublin, Ohio

[21] Appl. No.: 351,323

[22] Filed: Feb. 22, 1982

[51] Int. Cl.$^3$ .................. B05D 3/04; B05D 3/10
[52] U.S. Cl. ............... 427/340; 427/385.5; 525/75; 525/131; 525/440; 528/44; 528/53; 528/67; 528/79; 528/85
[58] Field of Search ............ 427/385.5, 335, 340, 427/342, 388.1, 388.2, 389.9, 393, 389.7, 391, 393.5; 528/53, 67, 44, 85, 79; 525/75, 131, 440, 442, 444, 460

[56] References Cited

U.S. PATENT DOCUMENTS

| | | | |
|---|---|---|---|
| 2,657,151 | 10/1953 | Gensel et al. | 427/340 |
| 2,967,117 | 1/1961 | Ariedter | 427/340 |
| 3,409,579 | 11/1968 | Robins | 528/53 |
| 3,429,848 | 2/1969 | Robins | 528/53 |
| 3,523,100 | 8/1970 | Stein et al. | 528/85 |
| 3,676,392 | 7/1972 | Robins | 528/85 |
| 3,773,696 | 11/1973 | Papa et al. | 528/85 |
| 3,789,044 | 1/1974 | Taft | 528/53 |
| 3,836,491 | 9/1974 | Taft | 528/53 |
| 3,874,898 | 4/1975 | McInnes et al. | 427/385.5 |
| 3,925,319 | 12/1975 | Hiatt et al. | 528/67 |
| 3,933,727 | 1/1976 | Schmid | 528/53 |
| 4,038,239 | 7/1977 | Coyner et al. | 528/67 |
| 4,179,427 | 12/1979 | Gardikes | 523/143 |
| 4,267,239 | 5/1981 | Thankachan et al. | 427/385.5 |
| 4,298,658 | 11/1981 | Thankachan et al. | 427/385.5 |
| 4,314,962 | 2/1982 | Wollensak et al. | 528/85 |
| 4,331,782 | 5/1982 | Linden | 528/53 |
| 4,343,839 | 8/1982 | Blegen | 427/340 |
| 4,343,924 | 8/1982 | Linden | 427/385.5 |
| 4,365,039 | 12/1982 | Blegen | 427/340 |
| 4,366,193 | 12/1982 | Linden et al. | 427/340 |
| 4,368,222 | 1/1983 | Blegen et al. | 427/340 |

FOREIGN PATENT DOCUMENTS 1351881 5/1974 United Kingdom.
1369351 10/1974 United Kingdom.

OTHER PUBLICATIONS

Taft et al., "Vapor Permeation Curing", *FATIP EC Congress*, II, 1972, pp. 335–342.

*Primary Examiner*—Sadie L. Childs
*Attorney, Agent, or Firm*—Mueller and Smith

[57] ABSTRACT

Disclosed is a coating composition which is rapidly curable at room temperature in the presence of a vaporous tertiary amine catalyst. The coating composition comprises an aromatic hydroxyl functional polyol comprising 2,3',4-trihydroxydiphenyl and a multi-isocyanate curing agent.

8 Claims, No Drawings

VAPOR PERMEATION CURABLE COATING COMPOSITIONS CONTAINING 2,3',4-TRIHYDROXYDIPHENYL

BACKGROUND OF THE INVENTION

The present invention relates to phenol-functional resins cured with isocyanate cross-linking agents and more particularly to such a system which is curable in the presence of vaporous tertiary-amine catalyst.

Vapor Permeation Cure (VPC) has been proposed on a limited basis by the prior art. For example, U.S. Pat. No. 2,967,117 shows a coating composed of a polyhydroxy polyester and a polyisocyanate which are cured in the presence of a gaseous tertiary amine or phosphine. The polyester contains aliphatic hydroxyl groups and heating of the coated substrate at about 60°–120° C. prior to or concomitant with the vaporous tertiary amine exposure is taught in the specification and examples. U.S. Pat. No. 3,874,898 shows a coating composed of a polymer containing only isocyanate functionality which can be cured in the presence of a vaporous amine. VPC technology additionally has been used for curing foundry binder compositions of a phenol-aldehyde resin (U.S. Pat. No. 3,409,579). Relative to the benzylic ether phenolic resin disclosed therein, reference also is made to U.S. Pat. Nos. 3,485,797, 3,676,392, and 3,501,552. For coatings applications, a hydroxy functional polyester may be end-capped with hydroxybenzoic acid as taught in U.S. Pat. No. 3,836,491, a phenol reacted with an unsaturated fatty acid or the like as taught in U.S. Pat. No. 3,822,226, or an epoxy polymer capped with hydroxybenzoic acid as taught in U.S. Pat. No. 3,789,044. British Pat. No. 1,351,881 modifies a polyhydroxy, polyepoxy, or polycarboxyl resin with the reaction product of a phenol and an aldehyde. The reaction product is curable with an isocyanate cross-linking agent in the presence of a vaporous tertiary amine. British Pat. No. 1,369,351 proposes a hydroxy or epoxy compound which has been reacted with diphenolic acid. The resulting compound is curable with a polyisocyanate according to VPC techniques.

In commonly assigned application Ser. No. 06/252,844, filed Apr. 10, 1981, now U.S. Pat. No. 4,366,193, a vapor permeation curable coating composition based on catechol is disclosed. It is noted in such application that resorcinol and hydroquinone do not rapidly react with isocyanate curing agents in the presence of vaporous tertiary amine catalyst whereas catechol did rapidly react with isocyanate curing agents under such conditions. Such application further postulates that the position of the two hydroxyl groups ortho to one another permits hydrogen bonding interaction which accelerates the curing process. Unexpectedly, it has been determined that a particular substituted resorcinol will rapidly react in the vapor permeation cure coating process contrary to such prior teachings.

BROAD STATEMENT OF THE INVENTION

The present invention relates to coating compositions which are rapidly curable at room temperature in the presence of vaporous tertiary amine catalyst. The coating composition comprises an aromatic-hydroxyl functional polyol comprising 2,3',4-trihydroxydiphenyl and a multi-isocyanate curing agent comprising between about 10% and 100% by weight of an aromatic multi-isocyanate and between about 0% and 90% by weight of an aliphatic multi-isocyanate. The coating composition can be dispersed in a fugitive organic solvent therefor if desired. The trihydroxydiphenyl can serve as the sole polyol in the coating composition or can be in admixture with additional polyols containing substantially only aromatic hydroxyl functionality. Some formulations, then, advantageously will utilize the trihydroxydiphenyl as a reactive diluent.

Advantages of the present invention include the ability to cure a coating composition at room temperature in rapid fashion. Another advantage is the ability to formulate a higher solids coating composition of relatively low viscosity. These and other advantages will become readily apparent to those skilled in the art based upon the disclosure contained herein.

DETAILED DESCRIPTION OF THE INVENTION

As noted above and demonstrated in the examples which follow, resorcinol (1,3-dihydroxybenzene), does not rapidly react with isocyanate curing agents in the presence of vaporous tertiary amine catalyst. The substituted trihydroxydiphenyl compound disclosed herein does not have hydroxyl groups in an ortho position to one another, though orientation of the molecule may permit advantageous intermolecular interaction which contributes to the excellent reactivity expressed by such compound under vapor permeation curing conditions. At the present time the unexpected practical reactivity of the substituted resorcinol compound is not fully understood.

Another contribution which the trihydroxydiphenyl compound displays in vapor permeation curable coatings is the relative unreactivity of such aromatic hydroxy groups with isocyanate groups in the absence of the catalyst. Thus, the trihydroxydiphenyl compound can be directly admixed with isocyanate curing agents suitably in a solvent therefor, and such mixture remains a non-gelled liquid for time periods in excess of 4 hours and on up to 10 hours or more at room (ambient) temperature. Such an excellent pot life of the coating composition is extremely important in commercial practice of the invention where it is highly advantageous for the coating composition to display a pot life of at least one-half of a shift (eg. 4 hours) and desirably at least one shift so that workers in the plant do not have to stop and formulate coating compositions at frequent intervals during their shift. The coating composition of the present invention provides a pot life which meets or exceeds commercial expectations therefor. Notwithstanding such relative unreactivity with isocyanate curing agents in the pot, trihydroxydiphenyl reacts with such isocyanate curing agents in the presence of the catalyst in very rapid fashion. Thus, an applied film of the coating composition can be cured in the presence of a vaporous tertiary-amine catalyst in as short an exposure time as 15–30 seconds at room temperature.

While 2,3',4-trihydroxydiphenyl may be further substituted, its elementary form can be preferred for use in the coating composition of the present invention. Such compound is inexpensive to produce and of relatively low value in commercial circles today. That is, the trihydroxydiphenyl compound can be found as a crude product in resorcinol bottoms. As a low value, bottoms product, its cost is presently not a great factor. The compound, though, can be readily utilized as a polyol in vapor permeation curable coating compositions. While advantageous coatings performance can be realized from use of the 2,3',4-trihydroxydiphenyl alone with the multi-isocyanate curing agent, it can be advantageous to use such trihydroxydiphenyl compound as a reactive diluent for polyol polymers heretofore disclosed as being useful in vapor permeation curable coating compositions. The trihydroxydiphenyl compound contributes advantageously to solids content of the coating composition while having the ability to perform diluent or solvent functionalities. Conventional vapor permeation curable coating composition polyols can be found in those citations noted above, for example.

Multi-isocyanate cross-linking agents cross link with the aromatic hydroxyl groups of the resulting adduct-capped polymer under the influence of a vaporous tertiary amine to form urethane linkages and to cure the coating. Aromatic isocyanates are necessary in order to obtain the desired rapid reaction in the presence of the vaporous tertiary amine catalysts at room temperature. For high performance coatings, initial color as well as the discoloration due to sunlight can be minimized by including at least a moderate level of aliphatic isocyanate content in the curing agent. Of course, polymeric isocyanates are employed in order to reduce toxic vapors of isocyanate monomers. Further, alcohol-modified and other modified isocyanate compositions find utility in the invention. Multi-isocyanates preferably will have from about 2-4 isocyanate groups for use in the coating composition of the present invention. Suitable multi-isocyanates for use in the present invention include, for example, hexamethylene diisocyanate, 4,4'-toluene diisocyanate (TDI), diphenylmethane diisocyanate (MDI), polymethyl polyphenyl isocyanate (Polymeric MDI or PAPI), m- and p- phenylene diisocyanates, bitolylene diisocyanate, triphenylmethane triisocyanate, tris-(4-isocyanatophenyl) thiophosphate, cyclohexane diisocyanate (CHDI), bis-(isocyanatomethyl) cyclohexane ($H_6XDI$), dicyclohexylmethane diisocyanate ($H_{12}MDI$), dimer acid diisocyanate (DDI), trimethyl hexamethylene diisocyanate, lysine diisocyanate and its methyl ester, isophorone diisocyanate, methyl cyclohexane diisocyanate, 1,5-naphthalene diisocyanate, triphenyl methane triisocyanate, xylylene and xylene diisocyanate and methyl derivatives thereof, polymethylene polyphenyl isocyanates, chlorophenylene-2,4-diisocyanate, and the like and mixtures thereof. Aromatic and aliphatic polyisocyanate dimers, trimers, oligomers, polymers (including biuret and isocyanurate derivatives), and isocyanate functional prepolymers often are available as preformed packages and such packages are suitable for use in the present invention also.

The ratio of aromatic hydroxyl equivalents from the trihydroxydiphenyl compound to the isocyanate equivalents of the multi-isocyanate cross-linking agent should be greater than 1:1 and can range on up to about 1:2. The precise intended application of the coating composition often will dictate this ratio or isocyanate index. At high cross-linking densities or isocyanate equivalents, harder but relatively inflexible films are produced while at lower cross linking densities or isocyanate equivalents flexibility of the films increases. Optimizing the particular property or combination of properties desired can be determined as those skilled in this art will appreciate.

Usually a solvent or vehicle for the coating composition may be desired and advantageously such solvent is a volatile organic solvent. Typical solvents include, for example, methyl ethyl ketone, acetone, methyl isobutyl ketone, ethylene glycol monoethyl ether acetate, xylene, toluene, and the like, and often mixtures thereof. The proportion of solvent, and hence the non-volatile solids content of the coating composition, depends upon factors including method of application, desired application viscosity, and the like factors.

A variety of additives can be included in the coating composition. The coating composition can contain opacifying pigments and inert extenders such as, for example, titanium dioxide, zinc oxide, clays such as kaolinite clays, silica, talc, and the like. Additionally, the coating composition can contain corrosion inhibiting pigments, plasticizers, flow leveling agents, surfactants, tinctorial pigments, and a wide variety of conventional coating additives.

The coating composition of the present invention can be cured in the presence of a tertiary amine such as, for example, triethylamine, dimethyl ethyl amine, dimethyl cyclohexyl amine, methyl diethyl amine, and the like, by exposure thereto for times ranging from as short as 5 seconds on up to 30 seconds or longer. The coating composition thus cured may be immediately handled without fear of tackiness or blocking of the cured film.

In practicing the present invention, the coating composition is applied to the substrate by direct roll coat or curtain coating with or without knife, reverse roller coat, atomized application, or like conventional technique. Use of two-head spray equipment is unnecessary since the coating composition of the present invention possesses such an excellent pot life. After the film is applied to the substrate, the coated substrate is passed through a zone or region which contains the vaporous tertiary amine. Representative vapor curing chambers for vapor curing the coating include those shown in U.S. Pat. Nos. 3,851,402 and 3,931,684, the disclosures of which are expressly incorporated herein by reference. The vaporous tertiary amine often is admixed with a carrier gas, such as an inert gas like nitrogen or carbon dioxide, in order to facilitate its dispersion in the curing chamber as well as for minimizing the chance of explosion. The saturated atmosphere in the curing chamber normally will contain the vaporous tertiary amine in a proportion of between about 2% and 12% with catalyst concentrations somewhere in the range of 4-8% being preferred. Room temperature may be maintained during the entire sequence of operations from coating to curing of the coated substrate. An advantage of room temperature curing of the coating is that application to thermoplastic substrates which are sensitive to heat can be practiced. In this regard, substrates suitable for being coated by the coating composition of the present invention include, for example, metal, thermoplastic resins, hardboard or fiberboard, wood, paper, thermosetting resins, and the like.

The following examples show how the present invention can be practiced but should not be construed as limiting. In this application all units are in the metric system unless otherwise expressly indicated. Also, all references cited herein are expressly incorporated herein by reference.

EXAMPLES

EXAMPLE 1

The 2,3',4-trihydroxydiphenyl was supplied at approximately 60% concentration with the remainder being some unidentified dihydroxybiphenyls and less than 1% resorcinol (Koch Chemical Company, Westwood, Massachusetts). This sample is believed to be a distillate of Penacolite resin RM-441 (a resorcinol bottoms product of Koppers Company, Inc, Pittsburgh, Pa., Penacolite being a registered trademark).

The coating composition consisted of 45.9 g of the 2,3',4-trihydroxydiphenyl, 35 g of Cellosolve acetate (ethylene glycol monoethyl ether acetate, Union Carbide Corporation, New York, New York, Cellosolve being a registered trademark), and 120.6 g of a multi-isocyanate curing agent (Mondur HC isocyanate is the tetrafunctional reaction product of hexamethylene diisocyanate and toluene diisocyanate, 11.5% NCO content, equivalent weight of 365, 60% solids in Cellosolve acetate/xylene, Mobay Chemical Company, Pittsburgh, Pa.).

Viscosity measurements of a sample of the coating composition were taken. The coating composition was coated onto glass plates (1 mil coating thickness) and cured by exposure for about 30 seconds to a vaporous triethylamine catalyst carried by N₂ carrier gas (about 7% catalyst by volume) in a gas curing chamber. The coated substrates removed from the chamber had a cured, tack-free films which could be handled without blocking. Performance evaluation of the coatings, as well as the viscosity data, are set forth below.

| Viscosity (cps) | |
|---|---|
| Immediate | 122.5 |
| 4 hr. | 132.5 |
| 24 hr. | 160.0 |
| 96 hr. | 220.0 |

| Sward[1] Hardness | | MEK[2] Rub | |
|---|---|---|---|
| RT[3] | HT[4] | RT | HT |
| 60 | 70 | 100+ | 100+ |

[1]Plate glass is defined as 100 for Sward Hardness.
[2]Methyl ethyl ketone (MEK) wetted ray rubbed over one area of cured film with moderate thumb pressure until glass substrate is visible.
[3]RT is room temperature.
[4]HT: Samples held at 160° C. for 5 minutes after vaporous amine catalyst exposure, then allowed to cool for 3 days at room temperature prior to testing.

The unexpectedly good cure and performance of the coating composition is demonstrated by the above-tabulated results. Moreover, when the coating composition was coated onto vinyl stock, a high gloss film resulted which could not be delaminated when folded double (two folds at 90° to one another) and creased forcefully. Also, the coating did not craze or whiten as a result of the double fold test. Excellent flexibility of the coating composition, thus, is demonstrated also.

EXAMPLE 2

In order to demonstrate the criticality of the position of two hydroxy groups on a benzene ring, the following formulations were compounded:

| Ingredient | Formulation (gms) | | |
|---|---|---|---|
| | A | B | C |
| 1,2-Dihydroxybenzene | 55 | — | — |
| 1,3-Dihydroxybenzene | — | 55 | — |
| 1,4-Dihydroxybenzene | — | — | 55 |
| Mondur MR Curing Agent[1] | 133 | 133 | 133 |
| Cellosolve Acetate Solvent | 55 | 55 | 55 |

[1]Mondur MR curing agent is a polymeric diphenylmethane diisocyanate of Mobay Chemical Corporation, Pittsburgh, Pa.

To each of the formulations was added one gram of liquid triethylamine catalyst and the resulting blend mixed. Formulations B and C still were liquid after more than 5 minutes following the catalyst addition at room temperature. Formulation A, however, gelled within about 3 seconds following the catalyst addition at room temperature. Thus, the criticality of the position of hydroxyl groups is demonstrated. Since resorcinol will not rapidly cure by vaporous tertiary amine techniques, it is quite unexpected and unobvious that the substituted resorcinol compound of the present invention does rapidly cure with an isocyanate curing agent in the presence of vaporous tertiary amine catalyst.

I claim:
1. A method for coating a substrate with a coating composition which comprises:
 (a) applying said coating composition to said substrate, said coating composition having a pot life of at least about 4 hours in an open pot and comprising:
  (1) an aromatic-hydroxyl functional polyol comprising 2,3',4-trihydroxydiphenyl; and
  (2) a polymeric multi-isocyanate curing agent containing at least about 10% aromatic isocyanate content by weight;
 (b) exposing said coated substrate to a vaporous tertiary amine catalyst to rapidly cure said coating at about room temperature.
2. The method of claim 1 wherein said coating composition is dispersed in a volatile organic solvent.
3. The method of claim 1 wherein the molar ratio of aromatic hydroxyl groups to the isocyanate groups of said curing agent is between about 1:1 and about 1:2.
4. The method of claim 1 wherein said multi-isocyanate curing agent contains between about 10% and 80% of an aromatic multi-isocyanate and between 90% and 20% of an aliphatic multi-isocyanate.
5. A coating composition rapidly curable at room temperature in the presence of a vaporous tertiary amine catalyst and possessing a pot life of at least about 4 hours in an open pot, comprising:
 (a) an aromatic-hydroxyl functional polyol comprising, 2,3',4-trihydroxydiphenyl;
 (b) a polymeric multi-isocyanate curing agent containing at least about 10% aromatic isocyanate content by weight.
6. The coating composition of claim 5 wherein the molar ratio of aromatic hydroxyl groups to the isocyanate groups of said curing agent is between about 1:1 and 1:2.
7. The coating composition of claim 5 wherein said multi-isocyanate curing agent contains between about 10% and 80% of an aromatic multi-isocyanate and between 90% and 20% of an aliphatic multi-isocyanate.
8. The coating composition of claim 5 wherein said coating composition is dispersed in a volatile organic solvent.

* * * * *